(12) United States Patent
Fischer et al.

(10) Patent No.: US 9,647,510 B2
(45) Date of Patent: May 9, 2017

(54) COOLING JACKET AND DEFLECTION UNIT FOR COOLING JACKETS

(75) Inventors: Raphael Fischer, Herzogenaurach (DE); Tobias Vogler, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 720 days.

(21) Appl. No.: 14/115,162

(22) PCT Filed: Feb. 2, 2012

(86) PCT No.: PCT/EP2012/051792
§ 371 (c)(1),
(2), (4) Date: Nov. 1, 2013

(87) PCT Pub. No.: WO2012/150046
PCT Pub. Date: Nov. 8, 2012

(65) Prior Publication Data
US 2014/0077634 A1    Mar. 20, 2014

(30) Foreign Application Priority Data
May 2, 2011   (DE) .................. 10 2011 075 045

(51) Int. Cl.
*H02K 5/20*      (2006.01)
*H02K 9/197*     (2006.01)
(Continued)

(52) U.S. Cl.
CPC ............ *H02K 9/197* (2013.01); *F28F 13/06* (2013.01); *F28F 13/08* (2013.01); *H02K 5/20* (2013.01);
(Continued)

(58) Field of Classification Search
CPC . H02K 5/20; H02K 9/197; F28F 13/06; F28F 13/08; F28F 2250/02; F28D 7/026; F28D 2021/0078
(Continued)

(56) References Cited

U.S. PATENT DOCUMENTS 4,159,740 A   7/1979  Seiling
5,531,484 A   7/1996  Kawano
(Continued)

FOREIGN PATENT DOCUMENTS

CN       22742659     11/2005
CN       201270447     7/2009
(Continued)

*Primary Examiner* — John K Kim
(74) *Attorney, Agent, or Firm* — Volpe and Koenig, P.C.

(57) ABSTRACT

A cooling jacket (14) for cooling an electric motor, in particular a stator (23), wherein a first spiral line (16) for transporting a coolant is formed at least partially on the cooling jacket (14). The aim of the invention is to provide a cooling system that is optimized in terms of mounting space and ensures axially equalized cooling. This aim is achieved in that a second spiral line (17) for transporting coolant is formed at least partially, and in that based on a common spiral axis R, both spiral lines (16, 17) form an axially integrated double spiral, wherein the first spiral line (16) is an inflow line and the second spiral line (17) is a return flow line. The invention further relates to a deflection unit (12) for the return into the second line (17), which substantially prevents the static pressure from dropping.

3 Claims, 2 Drawing Sheets

(51) Int. Cl.
 *F28F 13/06*  (2006.01)
 *F28F 13/08*  (2006.01)
 *F28D 7/02*  (2006.01)
 *F28D 21/00*  (2006.01)

(52) U.S. Cl.
 CPC ...... *F28D 7/026* (2013.01); *F28D 2021/0078* (2013.01); *F28F 2250/02* (2013.01)

(58) Field of Classification Search
 USPC .............................................. 310/52, 54, 59
 IPC .............................................. H02K 5/20, 9/197
 See application file for complete search history.

(56) References Cited

U.S. PATENT DOCUMENTS

| | | | | |
|---|---|---|---|---|
| 5,561,334 | A * | 10/1996 | Ishida | H02K 9/06 310/263 |
| 5,856,716 | A * | 1/1999 | Coupart | B21D 22/105 165/104.33 |
| 5,939,808 | A | 8/1999 | Adames | |
| 7,009,317 | B2 | 3/2006 | Cronin et al. | |
| 7,737,584 | B2 * | 6/2010 | Muller | H02K 5/20 310/52 |
| 7,745,965 | B2 * | 6/2010 | Oestreich | H02K 5/20 310/52 |
| 8,132,424 | B2 * | 3/2012 | Burn | F25C 1/14 165/171 |
| 8,552,603 | B2 * | 10/2013 | Minemura | H02K 9/193 310/52 |
| 8,803,379 | B2 * | 8/2014 | Hennings | H02K 5/20 310/58 |
| 2005/0151431 | A1 * | 7/2005 | Cronin | H02K 9/19 310/60 A |
| 2008/0231125 | A1 | 9/2008 | Verrier et al. | |
| 2008/0303359 | A1 * | 12/2008 | Oestreich | H02K 5/20 310/54 |
| 2010/0001597 | A1 | 1/2010 | Noll | |
| 2011/0101802 | A1 * | 5/2011 | Hennings | H02K 5/20 310/58 |
| 2014/0077634 | A1 * | 3/2014 | Fischer | F28F 13/06 310/54 |

FOREIGN PATENT DOCUMENTS

| | | |
|---|---|---|
| CN | 101562366 | 10/2009 |
| CN | 101847909 | 9/2010 |
| CN | 101924414 | 12/2010 |
| DE | 112041 | 3/1975 |
| DE | 3136880 | 4/1983 |
| DE | 69520700 | 4/2001 |
| DE | 202004018968 | 3/2005 |
| DE | 102005052364 | 5/2007 |
| DE | 102010025650 | 1/2011 |
| DE | 102009051881 | 5/2011 |
| EP | 1669689 | 6/2006 |
| WO | 2007065762 | 6/2007 |

* cited by examiner

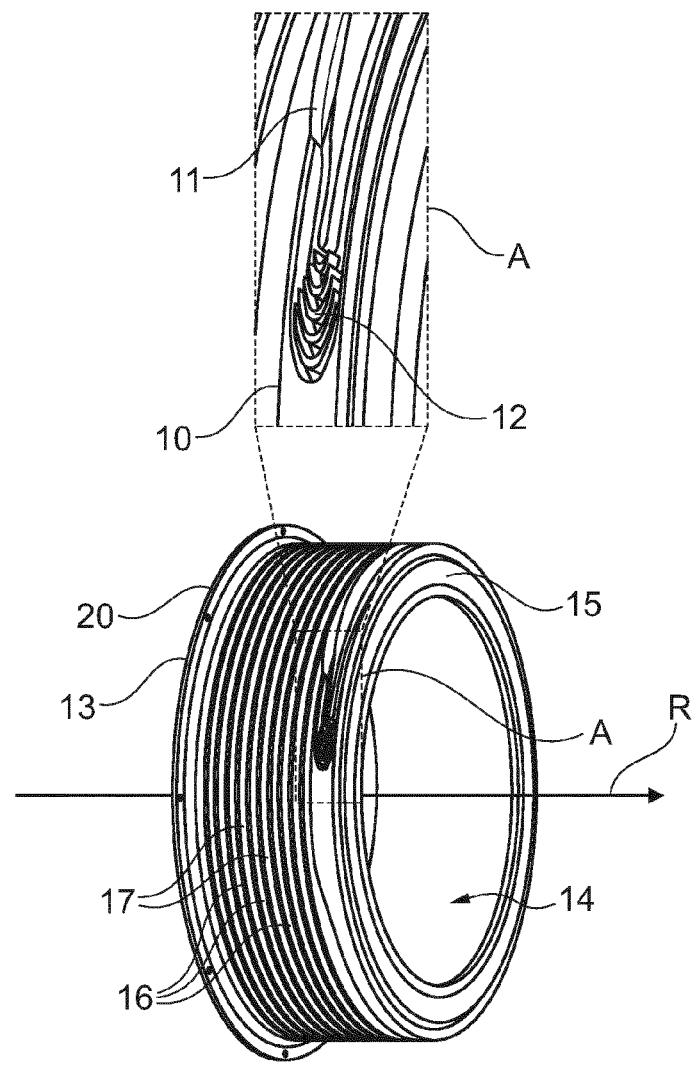
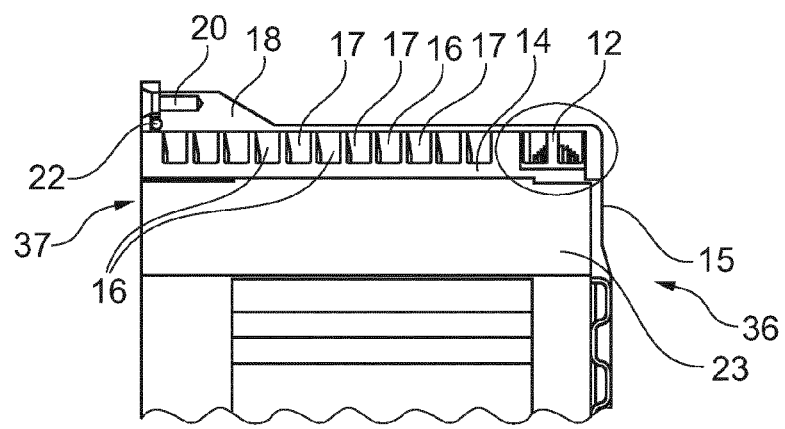

COOLING JACKET AND DEFLECTION UNIT FOR COOLING JACKETS

FIELD OF THE INVENTION

The invention relates to a cooling jacket for cooling an electric motor, in particular a stator, wherein the waste heat from the electric motor is absorbed and transported away by coolant which flows in a first line. The cooling jacket at least partially forms a first spiral line for transporting a coolant. The invention also relates to a deflection unit which allows a high degree of freedom in respect of routing the line.

BACKGROUND

DE 10 2005 052 364 A1 discloses an electric motor, a spiral line for transporting a coolant being formed on the stator of said electric motor. The coolant lines are formed by a housing and a projection which runs in a spiral manner on the outer face of said housing parallel to the longitudinal axis of the electric motor, and also by a cup-like cover. The inflow and the outlet of the coolant lines are made in the cup-like cover, as a result of which it is necessary to establish connections to the coolant line axially on both sides.

One problem with this is that in the case of wheel hub motors, but also in the case of other electric motors, radial installation space is disadvantageously lost since a coolant line, for example in the form of a hose, has to be routed past the electric motor in the axial direction either from the inflow or from the outlet. On account of these dedicated feed lines, it would not be possible to utilize a relatively large annular installation space for the electric motor.

In addition, there are no alternatives for fitting a feed line of this kind either through the coils of the stator or closer to the rim because it would likewise not be possible to utilize a large annular installation space in either case, or a new problem would arise as a result of said feed line being routed through.

SUMMARY

The object of the invention is therefore to specify a cooling jacket for an electric motor, which cooling jacket can be designed to be flat in the radial direction and nevertheless ensures uniform cooling of the electric motor.

The object is achieved by a cooling jacket of the kind disclosed in the introductory part with a second spiral line for transporting the coolant being at least partially formed on the cooling jacket, and the two spiral lines forming an axially integrated double spiral in relation to a common spiral axis, wherein the first spiral line is provided in the form of a feed flow line and the second spiral line is provided in the form of a return flow line.

A cooling jacket is a cooling apparatus which ensures cooling over as large an area as possible, wherein the cooling lines are routed in such a way that waste heat, in particular from the stator, is absorbed as effectively as possible. A metal, in particular aluminum, can therefore be used to manufacture the cooling jacket. The cooling jacket can be designed, in particular in electric motors with external rotors, in a substantially cylindrical or hollow-cylindrical manner or as a toroidal segment or in a similar manner. Furthermore, a circular base area is not absolutely necessary. The cooling jacket can also be designed as a prism with entirely different base areas, wherein the height of the prism ideally corresponds to the rotation axis of the electric motor.

The first spiral line and the second spiral line are formed on the cooling jacket. In this case, spiral means that the lines are arranged around a spiral axis and extend along the spiral axis both in the circumferential direction and also in the axial direction, wherein the spiral axis ideally coincides with the rotation axis of the electric motor or lies very close to it. A special case of spiral is helical. In this case, the individual lines depict a helical line which are arranged on geometrically on a cylindrical or hollow-cylindrical cooling jacket and, given a defined screw pitch, extend in the axial direction in relation to the spiral axis, wherein the spiral axis forms the axis of symmetry of the cylinder or hollow cylinder.

In this case, the spiral lines can be radially open and, for example, each form a slot. In this respect, they can be formed only partially through the cooling jacket. The radial boundary of these partially formed lines can be provided by a suitable cover. In this case, this cover can alternately provide cover radially to the outside or radially to the inside, depending on the direction in which the partially formed lines or slots are oriented. To this end, the cover can selectively radially continue the lines and then radially cover said lines, or immediately radially cover said lines.

The two spiral lines form an axially integrated double spiral in relation to a common spiral axis, wherein the first spiral line is provided in the form of a feed flow line and the second spiral line is provided in the form of a return flow line. This firstly ensures that always only either the first or the second line provide radial cover and, respectively, can tap off the incident thermal energy. The first line and the second line are axially oriented in relation to one another over the respectively formed spirals and therefore form a double spiral. In order to form this double spiral, both lines have the same pitch in the axial direction in relation to the common spiral axis, in order to be able to be integrated axially one into the other. In this case, a partial piece of the second spiral line can in each case be arranged immediately axially adjacent to the left and right of the first spiral line. However, as an alternative, further cooling lines or other elements can also be accommodated there.

On account of the feed and return flow in the double spiral, the cooling liquid provides a cooling power which is compensated in the axial direction on average by means of two axially adjacent partial pieces of the two lines. Depending on the use, this can have a highly motor-friendly effect.

By way of example, the compensated cooling can be used to increase the initial temperature of the coolant (coolant temperature). In the case of a single spiral, the difference between the temperature gradient of the motor and the cooling line would be much greater in the vicinity of the inlet than at the outlet. Since there are adjacent lines with coolant at very different temperatures in the case of the double spiral, the resulting temperature gradients between the cooling jacket and the motor vary far less in the axial direction. Knowing that the best cooling is possible in principle at a temperature gradient which is as high as possible, low temperature gradients should be avoided. Precisely this is the case in a double spiral. The coolant temperature in the feed flow line is considerably lower than that in the return flow line. However, since both lines always run very close to one another, the respective temperature gradients in relation to the motor are averaged, as a result of which the resulting temperature gradient varies considerably less in the axial direction. Consequently, the initial temperature of the coolant can be comparatively high, as a result of which less cooling power has to be expended in order to adjust the temperature of the coolant. As an alternative or as an option, the throughflow cross section of the lines in the double spiral can be reduced, with the initial temperature remaining the same, as a result of which installation space is saved.

Furthermore, the axially compensated cooling by means of the double spiral has the further advantage that, on account of the uniformity, all of the points within the motor which are susceptible to heating no longer have to be monitored by means of a sensor, which is costly, but rather may require only one further sensor which also allows conclusions to be drawn about other measurement points by virtue of appropriate calibration.

A further advantage is that the first line and the second line are connected to one another at an axial end of the cooling jacket by way of a deflection unit, as a result of which both the inlet and the outlet of the cooling system can be arranged on one axial side. In this case, it is selectively possible to allow the inlet/outlet to open out in the radial or axial direction, that is to say to transmit coolant with the aid of a connection or plug in the axial or radial direction. The two connections can advantageously also be connected to a coolant reservoir, for example a water tank, in one operation for example by means of a double hose. Particularly in the case of wheel hub motors, but also in the case of other electric motors, wheel-side access to a coolant line is not possible. Access in this way cannot be realized radially on account of the rim. Therefore, coolant supply axially on the vehicle side can be ensured—in an effective manner.

In an advantageous embodiment, the cooling jacket forms a third spiral line and a fourth spiral line, together with the first spiral line and the second spiral line, form an axially integrated quadruple spiral. In other words, two double spirals can be integrated in the same way once again to form a quadruple spiral. A multiple spiral is therefore always formed from double spirals. This is expedient when, for example, autonomous cooling systems with different lines, pumps and coolant reservoirs are required.

A cooling jacket with a first, second, third and fourth line can advantageously also be covered by a cover in the radial direction.

An inflow to the first spiral line and also an outflow from the second spiral line are arranged on the cooling jacket, for example on the second, axial side of the cooling jacket, as a result of which a double spiral can advantageously be used for the cooling circuit. The second axial side of the cooling jacket should in this case be the side which is easily accessible to cooling hoses or pipes. In the case of a wheel hub motor, the second axial side would be that side which faces the vehicle, and the first axial side would be that which is covered by the rim.

In an advantageous embodiment, the first spiral line is connected to the second spiral line and the third spiral line is connected to the fourth spiral line on a first, axial side of the cooling jacket by means of a deflection unit which conducts the coolant. As a result, the second spiral line either can be connected to the third spiral line (only one circuit) or not (two circuits) on the second, axial side.

A double spiral comprising two spiral lines can advantageously have a deflection unit for changing the direction of the coolant flow, said deflection unit advantageously comprising a coolant inlet, a coolant outlet and a multiple line system comprising at least one blade element for separating the coolant flow into at least two partial flows and subsequently combining the partial flows. The deflection unit is connected both to the first and to the second spiral line, as a result of which the coolant flow is deflected from the first line to the second line (or vice versa). In this case, the respective flow directions can substantially or exactly form a 180-degree reversal. Deflections of between 90 and 180 degrees are likewise feasible. In this case, the sharp deflections of 160 to 180 degrees are preferred because they usually lead to a very large saving in installation space—irrespective of the geometry of the electric motor or stator which is to be cooled.

A large number of cascaded blade elements form a partial flow by means of blade arms, said partial flow being routed and deflected between two blade elements. Therefore, there is no deflection of the total flow in its entirety, but rather individual deflections of a large number of, usually all of, the partial flows. The greater the change in direction of a partial flow is intended to be, the larger the throughflow cross section has to be designed to be. The throughflow cross section of the respective partial flow is greatest between a blade rear area and a blade base of adjacent blade elements. This point can be considered to be the apex or turning point in respect of the entire routing of the line.

The flow rate of the coolant is slowest at this apex or turning point because the total throughflow cross section of the partial flows is several times greater than the throughflow cross section of the coolant inlet or outlet. In line with Bernoulli's Law, according to which the sum of the static pressure and of the dynamic pressure is constant, a sharp increase in the dynamic pressure and a consequently unavoidable drop in the static pressure, which should be kept as uniformly high as possible at all points for operation of the coolant circuit, would accompany a constant throughflow cross section and a deflection in the opposite direction (180 degrees). Therefore, a deflection in the opposite direction given a constant throughflow cross section constitutes a blockage- or infarction-like situation which can be avoided with the partial-flow-based deflection unit because the flow rate of the partial flows is reduced in a manner which is inversely proportional to the increase in the total throughflow cross section.

A throughflow cross section is the sectional area of a coolant line or of a partial flow to which the flow direction of the respective coolant line or partial flow is perpendicular. The total throughflow cross section is the sum of the throughflow cross sections of a plurality of partial flows at points which correspond to one another.

The largest throughflow cross sections of the partial flows are each advantageously larger than two times, three times, four times or five times the throughflow cross section of the coolant inlet or of the coolant outlet of the deflection unit, as a result of which the installation space can also be utilized in an optimum manner.

The average flow rate across the largest throughflow cross section of a partial flow is advantageously two times, three times, four times or five times as slow as the flow rate across the throughflow cross section of the coolant inlet or coolant outlet. By virtue of forming a plurality of partial flows with a corresponding number of blade elements, the flow rate can be reduced as desired, so that control, in particular reduction of the coolant flow by means of the static pressure (coolant pump), is ensured.

In an advantageous embodiment, a blade element separates the partial flow at the blade base of the blade element from an adjacent partial flow at the blade rear area of the blade element. The blade element has a tapering blade arm in each case in the flow direction and in the opposite flow direction. The distance between the blade arms defines the separation of the partial flow from the main flow (for example 10, 20 or 30 percent of the main flow).

The deflection unit is advantageously designed as a closed ring, as a ring segment and/or as an injection-molded part. The closed ring makes radial positioning easier and can also be axially correctly positioned using corresponding engagement elements. The same applies for the ring segment. The design as an injection-molded part is cost-effective in comparison to machining processing.

It is also advantageous for the geometry of the deflection unit to require installation on the cooling jacket at the correct angle. As a result, it is possible to ensure that the first and second or third and fourth spiral lines are connected to one another without disadvantageous leakage, or even are incorrectly connected in such a way that no flow connection is ensured. Therefore, cooling would not be functional.

Further advantageous embodiments and preferred developments of the invention can be found in the description of the figures and/or in the dependent claims.

BRIEF DESCRIPTION OF THE DRAWINGS

The invention will be described and explained in greater detail below with reference to the exemplary embodiments which are illustrated in the figures, in which:

FIG. 1 shows a hollow-cylindrical cooling jacket comprising an annular deflection unit of which a detail is shown in enlarged form, FIG. 2 shows a longitudinal section in relation to the rotation axis of the cooling arrangement, comprising the cooling jacket, deflection unit and cover.

DETAILED DESCRIPTION OF THE PREFERRED EMBODIMENTS

FIG. 1 shows a hollow-cylindrical cooling jacket 14 comprising an annular deflection unit 12 which is shown in a detail A in enlarged form.

The deflection unit 12 is in the form of a ring and connects the diametrically opposite openings in the first and second lines 16, 17. Therefore, the deflection unit is arranged on the first axial side in relation to the rotation axis R of the motor (not depicted), which rotation axis coincides with the spiral axis, and avoids additional connections on the first axial side.

The spiral lines 16 and 17 which are designed as slots form helical lines on the hollow-cylindrical cooling jacket 14 and are open radially toward the outside. The radial flange 13 is used to support and fasten a cover 18 (see FIG. 2).

Figure 3:
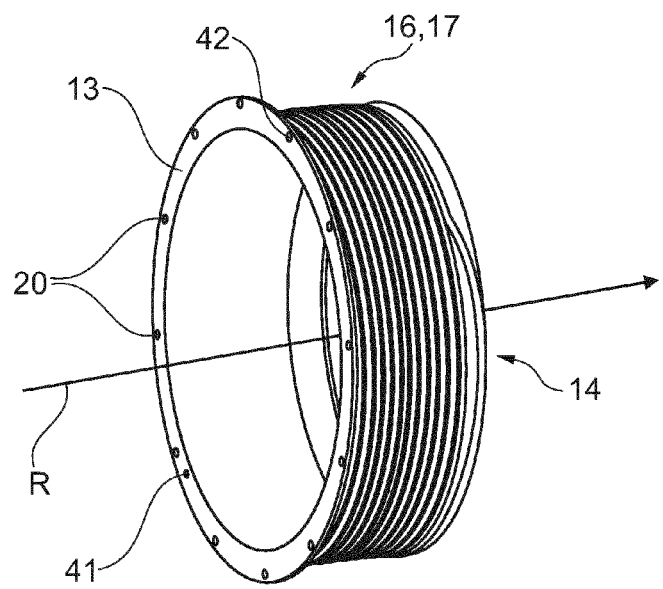
FIG. 3 shows a side of the cooling jacket from FIG. 1 which is opposite the deflection unit.

FIG. 2 and FIG. 3 showed a longitudinal section in relation to the rotation axis of the cooling arrangement comprising the cooling jacket 14, deflection unit 12 and cover 18.

The cover 18 is fastened to the annular flange 13 by means of at least one screw (not depicted) and a hole 20 and therefore radially closes off the cooling system. The number of screws can be varied depending on the required retaining and/or sealing force. This cooling system now has an inflow 41 and an outflow 42 on the radial flange 13 only on the vehicle side (second axial side) and can be connected solely from this side, thus saving installation space. Furthermore, the first line and second line which are arranged alternately in the axial direction lead to uniform heat dissipation.

The stator 23 is cooled over a large area by the cooling jacket 14, wherein said cooling jacket can be easily installed on the stator 23 on account of the annular jacket base 15. Furthermore, the deflection unit 12 is also pressed axially against the cooling jacket 14, and therefore fixed, by the cover 18. Since a coolant is supplied to the cooling system, a sealing ring 22 between the cover 18 and the cooling jacket 14 is expedient. A sealing ring can also be arranged at other points, such as on the first axial side in the vicinity of the deflection unit 12, between the cover 18 and the cooling jacket 14 or else between the annular jacket base 15 and the cooling jacket 14 for example, wherein the jacket base 15 can be integrally formed with the cover 18.

A side of the cooling jacket 14 from FIG. 1, which side is opposite the deflection unit 12, and the line which is routed from the diametrically opposite opening to the deflection unit 12, are shown.

The first line and/or second line advantageously form/forms a fluting or wrinkling which creates a turbulent flow (in contrast to a laminar flow), and ensures better distribution of the coolant and therefore also of the absorbed energy. As an alternative, rotation of the coolant (usually a fluid) about a flow longitudinal axis can be caused, for example by virtue of a helical design within the line.

It is also advantageous to implement an inlet or outlet by means of a blind hole, wherein a material-removing tool is radially supplied or discharged on the cooling jacket 14 in the radial direction. This interrupts the line in the circumferential direction in order to make it axially accessible by means of an axial hole.

As an alternative, an inlet or outlet can also be implemented an opening slot in which the also the opening runs over a wide portion of the circumference and does not necessarily exhibit a round shape.

Figures 4, 5:
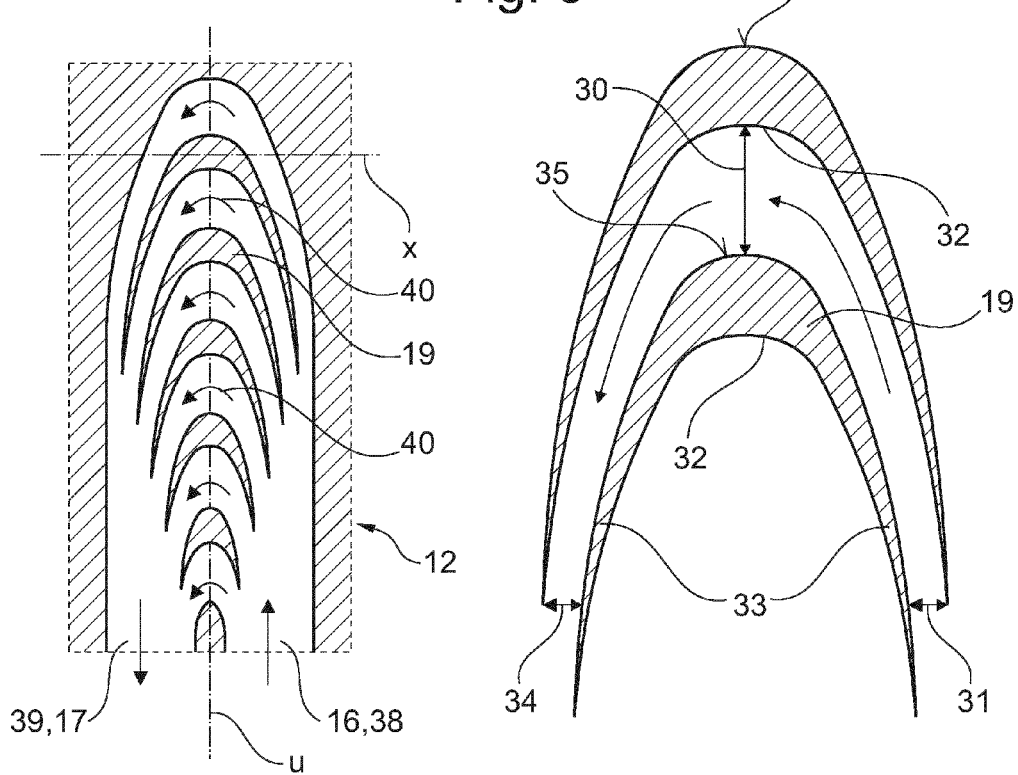
FIG. 4 shows a sectional illustration of the multiple line system of the deflection unit in the circumferential direction.
FIG. 5 shows adjacent blade elements of the multiple current system from FIG. 4.

FIG. 4 shows a sectional illustration of the multiple line system of the deflection unit 12 from FIG. 1 in the circumferential direction. The blade elements 19 are arranged in a cascaded manner and split the total flow into a plurality of slowly flowing partial flows 40. In comparison to the inlet 38, which is connected to line 16, the partial flows have a total throughflow cross section which is approximately four times larger than the throughflow cross section of the inlet 38. The same applies in relation to the throughflow cross section of the outlet 39.

The blade elements 19 are arranged in the circumferential direction U and deflect the cooling liquid along the circumference in the opposite direction.

FIG. 5 shows adjacent blade elements 19 of the multiple line system from FIG. 4. The blade arms 33 form, in each case in pairs, a blade inlet 31 and blade outlet 34, as a result of which the size of the partial flow 40 is defined. The largest throughflow cross section 30 is arranged between a blade base 32 and an adjacent blade rear area 35. In this exemplary embodiment, the largest throughflow cross section 30 is oriented along the circumferential direction U.

A widening in volume accordingly occurs along the blade arms 33 along the flow direction, said widening in volume being greatest at the largest throughflow cross section and correspondingly reducing again downstream of said throughflow cross section.

In summary, the invention relates to a cooling jacket 14 for cooling an electric motor, in particular a stator 23, wherein a first spiral line 16 for transporting a coolant is at least partially formed on the cooling jacket 14. This cooling jacket should exhibit cooling which is optimized in respect of installation space and ensures axially compensated cooling by a second spiral line 17 for transporting the coolant being at least partially formed on the cooling jacket 14, and the two spiral lines 16, 17 forming an axially integrated double spiral in relation to a common spiral axis R, wherein the first spiral line 16 is provided in the form of a feed flow line and the second spiral line 17 is provided in the form of a return flow line. Also specified is a deflection unit 12 for returning coolant to the second line 17, which deflection unit for the most part prevents a drop in the static pressure.

LIST OF REFERENCE SYMBOLS

10 Stop
11 Line transition
12 Deflection unit
13 Radial flange
14 Cooling jacket
15 Annular jacket base
16 First line
17 Second line
18 Cover
19 Blade element
20 Holes
22 Sealing ring
23 Stator
30 Blade passage
31 Blade inlet
32 Blade base
33 Blade arms
34 Blade outlet
35 Blade rear area
36 First axial side
37 Second axial side
38 Inlet
39 Outlet
40 Partial flow
41 Inflow
42 Outflow
R Spiral axis
A Detail
U Circumferential direction
X Axial direction

The invention claimed is:

1. A cooling jacket for cooling an electric motor, comprising a first spiral line for transporting a coolant formed at least partially on the cooling jacket, a second spiral line for transporting the coolant at least partially formed on the cooling jacket, the two spiral lines form an axially integrated double spiral in relation to a common spiral axis (R), the first spiral line is a feed flow line and the second spiral line is a return flow line, wherein the first spiral line is connected to the second spiral line on a first axial side of the cooling jacket by a deflection unit which conducts the coolant, the deflection unit including at least one blade element for separating the coolant flow into at least two partial flows and subsequently combining the partial flows, the at least one blade element includes a plurality of blade elements arranged in a cascaded manner in a circumferential direction.

2. The cooling jacket as claimed in claim 1, wherein the first spiral line and the second spiral line are covered by a cover in a radial direction.

3. The cooling jacket as claimed in claim 1, wherein an inflow to the first spiral line and an outflow from the second spiral line are arranged on a second axial side of the cooling jacket.

* * * * *